(No Model.)
J. H. & C. H. CAMPBELL.
PROCESS OF REFINING BUTTER, &c.
No. 532,528. Patented Jan. 15, 1895.
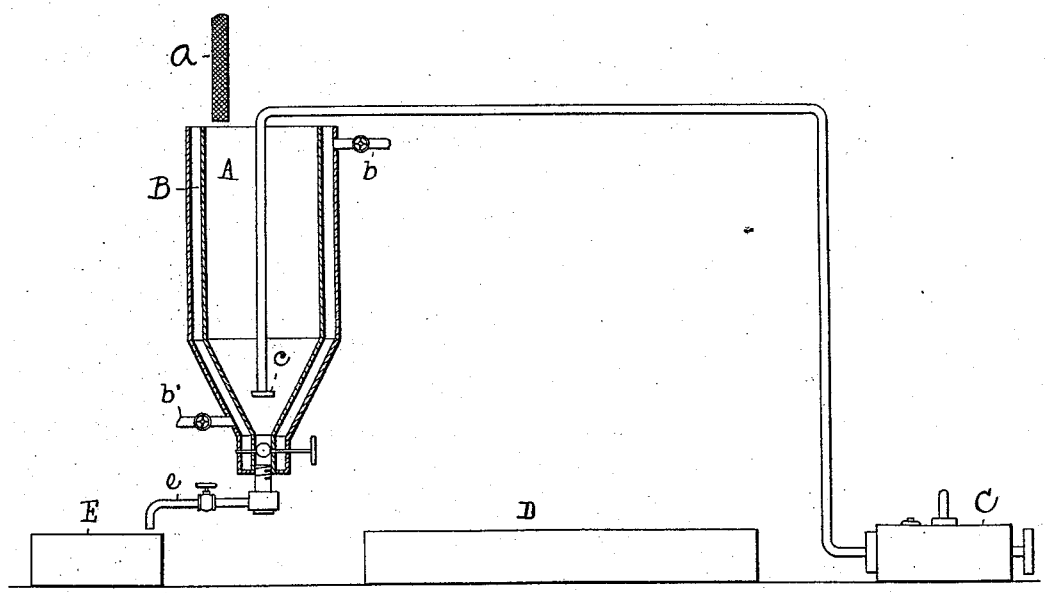

UNITED STATES PATENT OFFICE.

JOSEPH H. CAMPBELL AND CHARLES H. CAMPBELL, OF NEW YORK, N. Y.

PROCESS OF REFINING BUTTER, &c.

SPECIFICATION forming part of Letters Patent No. 532,528, dated January 15, 1895.

Application filed May 8, 1894. Serial No. 610,524. (No specimens.)

*To all whom it may concern:*

Be it known that we, JOSEPH H. CAMPBELL and CHARLES H. CAMPBELL, citizens of the United States, residing at New York city, in the county and State of New York, have invented a certain new and useful Improvement in the Processes of Refining Butter, Lard, Oils, and Fat, of which the following is a specification.

The present invention is a process for refining butter, oils, fats, lard, &c., which shall be simple and rapid in operation, and which does not require the employment of chemicals, and which may, at the same time, be conducted economically.

We have discovered that butter, whether the ordinary commercial butter, or such butter when deteriorated by exposure or when improperly made, or other impure fatty materials, may be rendered permanently sweet and wholesome by simply melting the same, removing the solid and semi-solid extraneous matters and then treating to an air blast while in a liquid state, whereby the water of combination will be carried off to permit of the ready separation of impurities, all of which will hereinafter be explained.

We shall confine ourselves to a description of the process of treating rancid or impure butter.

In general terms, we first melt such butter and allow the solid and semi-solid impurities therein contained to precipitate to the desired extent, removing by skimming such impure and objectionable products as rise to the surface of the melted material undergoing treatment and drawing off the settled impurities. We then turn on an air blast and continue the same for a period of time depending upon the impurities contained in the material undergoing treatment, the object being to deprive such material of all moisture so that the albuminoid substances contained in the material will become solids instead of semi-liquids. It can be determined when the albuminoid substances have become solid by the color, which will be darker and less transparent, than the melted material before treatment with the air blast. When the albuminoid substances have been deprived of moisture and have become, as it were, solids, the air blast is turned off and the material allowed to settle or is subjected to a filtering process. By either method the solid albuminoids are removed, whereby a pure butter-oil remains. If, after the air blast has been turned on the first time sufficiently long to deprive the mixture of all moisture and the same has thereafter had its solid impurities removed by settling or filtration, there should still be found an objectionable odor or flavor to the butter-oil, the same is again treated to the air blast as before, with the settling or filtration following. This butter-oil is then treated in the presence of milk or buttermilk to an air blast as will be hereinafter explained, so as to impart thereto the true butter flavor. Preferably the milk or buttermilk or cream in the presence of which the butter-oil is treated to the air blast, is itself treated to an air blast before mixture with the butter-oil at a temperature for the air blast of about 40° Fahrenheit, whereby offensive gases or vapors are removed from the milk, &c.

The process described above of treating the butter-oil may be facilitated by adding to the mixture after the air blast has been turned off about one-fourth of the weight of the material of water added at the top of the material so that the water may sink through the same and wash away with it the solid impurities. This water with its contained impurities is then drawn off and unless the material undergoing treatment was very impure, the residue will be found to be pure butter-oil. If not found to be pure, however, the air blast may be turned on to again deprive the material of all moisture and the solid impurities remaining after the second aeration may be allowed to settle, be filtered off, or be washed through and out by the water. This alternation of an air blast and removal by settling, filtration or washing may be continued until the desired pure butter-oil is obtained.

In the accompanying drawing forming part of this specification, the letter A designates a funnel-shaped receptacle into which the material to be treated is placed. This receptacle is jacketed for the reception of hot water or other heating medium, the jacket being lettered B, *b* being the ingress pipe controlled by a suitable cock, and b' the egress pipe for the heating medium, also suitably controlled by a suitable cock.

C represents a Root or other pressure blower, D an ice-water tank, and E what we have called a refuse tank. The impure contents of the vessel A are discharged into the refuse tank E, and the pure contents, either before or after treatment with materials to give the butter flavor, are discharged into the ice-water tank D. These discharges may be effected by turning the swiveled pipe e.

a is a water pipe from which water is supplied to the vessel A, and c is a rose or other perforated diaphragm attached to the bottom of the pipe leading from the Root blower, which pipe preferably is carried as shown to near the bottom of the vessel A.

The operation of the apparatus just described will now be described. The butter to be refined is put into the funnel-shaped vessel A, this shape being adopted for facilitating the accumulation and discharge of impure matters at the bottom thereof, although other shapes will answer. During the time the material is in the vessel A it is maintained at a temperature of about 125° Fahrenheit by means of the heat jacket B. This temperature will melt the butter and when melted it is allowed to stand for a period of time sufficiently long for the solid extraneous matter, as well as the semi-liquid substances that are commingled with the butter-oil to separate therefrom, a part usually rising to the surface and being removed by skimming, the larger part, and sometimes the whole, being precipitated. We have usually found the old salt in the neck of the funnel at or near the bottom, above this the water which was mechanically mixed with the butter, and above the water the curd which usually retains a small percentage of the butter-oil, and above that the butter-oil itself. By simply opening the cock at the bottom of the vessel A, the salt, water and curd are drawn off, the butter-oil remaining in the vessel. This butter-oil, however, according to our observations usually contains further objectionable properties which cannot be removed by precipitation or skimming. The best description of what we have termed objectionable properties we can give is that they arise from the presence of minute, flocculent, semi-liquid, albuminoid particles, together with a mucilaginous, gummy substance, which adhere to each other and to the molecules of butter, and so long as they remain the butter-oil is unfit for use in the manufacture of pure butter. We have found that the albuminoid substances may be deprived of moisture and solidified by the air blast and then removed by precipitation, filtering, or, more readily, by washing with water. After the impurities have been withdrawn as above described, we then force a blast of air through the residue, which blast by reason of the perforated diaphragm c will issue as jets into the tank or vessel A. This air is preferably dried so as to be deprived of moisture before entrance into the vessel A, so that it may take up any free water that may be mixed with the butter-oil, and may deprive the mucilaginous substances above referred to of the moisture therein contained.

It may be that what we have termed the albuminoid and mucilaginous substances are one and the same substance partaking of the two characteristics. At any rate, when the moisture of the contents of the vessel A is carried off by the air blast, the particles of objectionable matter no longer being mucilaginous and sticky are in a condition to be readily removed.

After the impurities have been removed as above described, we preferably introduce a quantity of water, say about a quarter as much by weight as there is butter-oil, on top of the contents of the vessel A and allow the same to settle through such contents, whereby there is washed or carried to the bottom of the vessel a certain amount of the objectionable properties still remaining. Especially will this treatment by water, which may be termed a showering, carry with it the remaining particles of curd and the solid albuminoid substances above referred to. Previous to treating with an air blast for the first time, we may add a small quantity of water in the manner just explained, which will wash or carry down by gravity a further quantity of the remaining objectionable properties, which water and its contained impurities should be drawn off before treatment with the air blast. If the oil remaining after the washing following the first air blast and the removal of the settled impurities, is not now in a sweet and pure condition and without offensive odors, the blower is again turned on and air forced through the contents of the vessel as before, the operation of showering and aerating being continued alternately until a perfectly sweet, pure oil free from all offensive gases and dark in color is obtained, it being understood that after each showering the contents are allowed to settle and are then drawn off before aeration. To convert this oil into butter of the proper flavor, we add thereto about one-half of its weight of sweet milk, previously raising the milk to a temperature of about 90° Fahrenheit. The air blast is then turned on and continued until the oil and milk are thoroughly commingled and reduced to the consistency of a very thick cream, when there is added a weight of sour milk or buttermilk equal to the weight of milk previously added, without, however, interrupting the operation of the air blast. The amount of sweet milk or buttermilk or sour milk added depends somewhat upon varying conditions. When the oil is dense, a greater amount of sweet milk may be added. If the sour milk is very acid, then a less quantity of that is used and a greater quantity of sweet milk, the addition of both depending upon the quality of butter to be produced. Before adding the cream, milk or sour milk to the butter-oil, preferably we aerate the milk, &c., at a temperature of about 40° Fahrenheit, whereby the flavor and odor of the milk, &c., are improved. When the sweet milk and butter-milk or sour milk and the butter-oil are all thoroughly commingled and at a temperature of about 102° Fahrenheit, the mixture is discharged into the tank D containing ice-water and will thereby be changed from a liquid to a solid in the form of minute flocks or crystals in which the sour milk and cream will be imprisoned. We now remove these flocks or crystals from the ice-water tank and place them on drain tables where they are permitted to remain for about twenty-four hours, or for a sufficiently long period of time for the sour cream or buttermilk to impart its flavor to the butter flakes or crystals. The material is then placed into a churn that contains preferably four times its weight of milk or cream that has previously been aerated at a temperature below 40° Fahrenheit and has also been previously churned until the butter is forming or until the butter is "broken," and the same is churned with the milk until the crystals have changed into small globules the size of a "buck-shot," or of the size and appearance such as have the particles produced in the ordinary method of churning. When this occurs, the product is removed from the churn and is reworked, salted and otherwise treated as is butter made in the usual way.

We claim—

1. The process of refining butter which consists in removing the impurities therefrom and subsequently treating the remaining purified butter oil to an air blast in the presence of milk, butter milk, cream or sour milk, substantially as set forth.

2. The process of refining butter which consists in removing the impurities therefrom, subsequently treating the remaining purified butter oil to an air blast in the presence of milk, butter milk, cream or sour milk, and then precipitating the mixture into a cold bath, substantially as set forth.

3. The process of refining butter which consists in treating a purified butter-oil in the presence of sweet milk to an air blast and subsequently adding to the mixture a quantiy of sour milk without interrupting the air blast, substantially as set forth.

4. The process of refining butter which consists in alternately treating the same to water and an air blast, then adding sweet milk to the purified butter-oil in the presence of an air blast until the mixture is of about the consistency of cream, then adding butter milk or sour milk without interrupting the air blast, substantially as set forth.

5. The process of refining butter which consists in alternately treating the same to water and an air blast, then adding sweet milk to the purified butter-oil in the presence of an air blast until the mixture is of about the consistency of cream, then adding butter milk or sour milk without interrupting the air blast, drawing the contents off into an ice tank, removing the flocculent particles thereby formed, and subsequently churning the same in the presence of sweet milk or cream, substantially as set forth.

6. The process of refining butter which consists in alternately treating the same to water and an air blast, then adding sweet milk to the purified butter-oil in the presence of an air blast until the mixture is of about the consistency of cream, then adding butter milk or sour milk without interrupting the air blast, drawing off the contents into an ice tank, then removing the flocculent particles thereby formed, and churning the same in the presence of milk or cream which has been already partially churned, substantially as set forth.

This specification signed and witnessed this 1st day of May, 1894.

J. H. CAMPBELL.
CHAS. H. CAMPBELL.

Witnesses:
EUGENE CONRAN,
JOHN R. TAYLOR.